United States Patent [19]

Lenardson

[11] Patent Number: 5,791,668
[45] Date of Patent: Aug. 11, 1998

[54] FOLDING SADDLE CARRIER

[76] Inventor: James A. Lenardson, 10144 Carson Dr., Tyler, Tex. 75704

[21] Appl. No.: 600,020

[22] Filed: Feb. 12, 1996

[51] Int. Cl.⁶ .................................................. B62B 1/12
[52] U.S. Cl. .................... 280/47.33; 280/655; 280/47:19
[58] Field of Search ............................... 280/35, 639, 655, 280/47.17, 47.18, 47.19, 47.24, 47.315, 47.33, 79.11, 79.3, 47.35; 211/85.11

[56] References Cited

U.S. PATENT DOCUMENTS

| | | | |
|---|---|---|---|
| 2,419,422 | 4/1947 | Schulein | 280/79.3 |
| 2,789,829 | 4/1957 | Parker | 280/47.18 |
| 2,945,699 | 7/1960 | Berlye | 280/79.3 |
| 3,930,663 | 1/1976 | Scripter | 280/36 |
| 4,790,559 | 12/1988 | Edmonds | 280/655 |
| 4,830,385 | 5/1989 | Wallick et al. | 280/47.24 |
| 5,165,553 | 11/1992 | Benson | 211/85.11 |
| 5,338,049 | 8/1994 | Goring | 280/47.315 |
| 5,362,078 | 11/1994 | Paton | 280/47.18 |
| 5,626,352 | 5/1997 | Grace | 280/655 |

FOREIGN PATENT DOCUMENTS 203097  12/1955  Australia ............................. 280/639

Primary Examiner—Brian L. Johnson
Assistant Examiner—Frank Vanaman
Attorney, Agent, or Firm—John M. Harrison

[57] ABSTRACT

A folding saddle carrier for carrying one or more saddles, accessories and equestrian equipment, which folding saddle carrier includes in a preferred embodiment, a wheeled frame fitted with an extensible saddle support riser that is pivotally attached at one end to the frame and a handle pivotally attached to the saddle support riser and the frame, such that manipulation of spring-loaded adjusting pins connected to the saddle support riser and the handle facilitates selective retraction and extension of the saddle support riser and the handle with respect to the frame. A saddle board support is pivotally attached to the free, telescoping end of the saddle support riser and is controlled by a pivot pin to facilitate horizontal orientation of the saddle board support when the telescoping end of the saddle support riser is raised by forward manipulation of the handle. One or two sets of adjustable saddle boards can be removably mounted on the saddle board support to accommodate one or a pair of saddles on the folding saddle carrier.

5 Claims, 4 Drawing Sheets

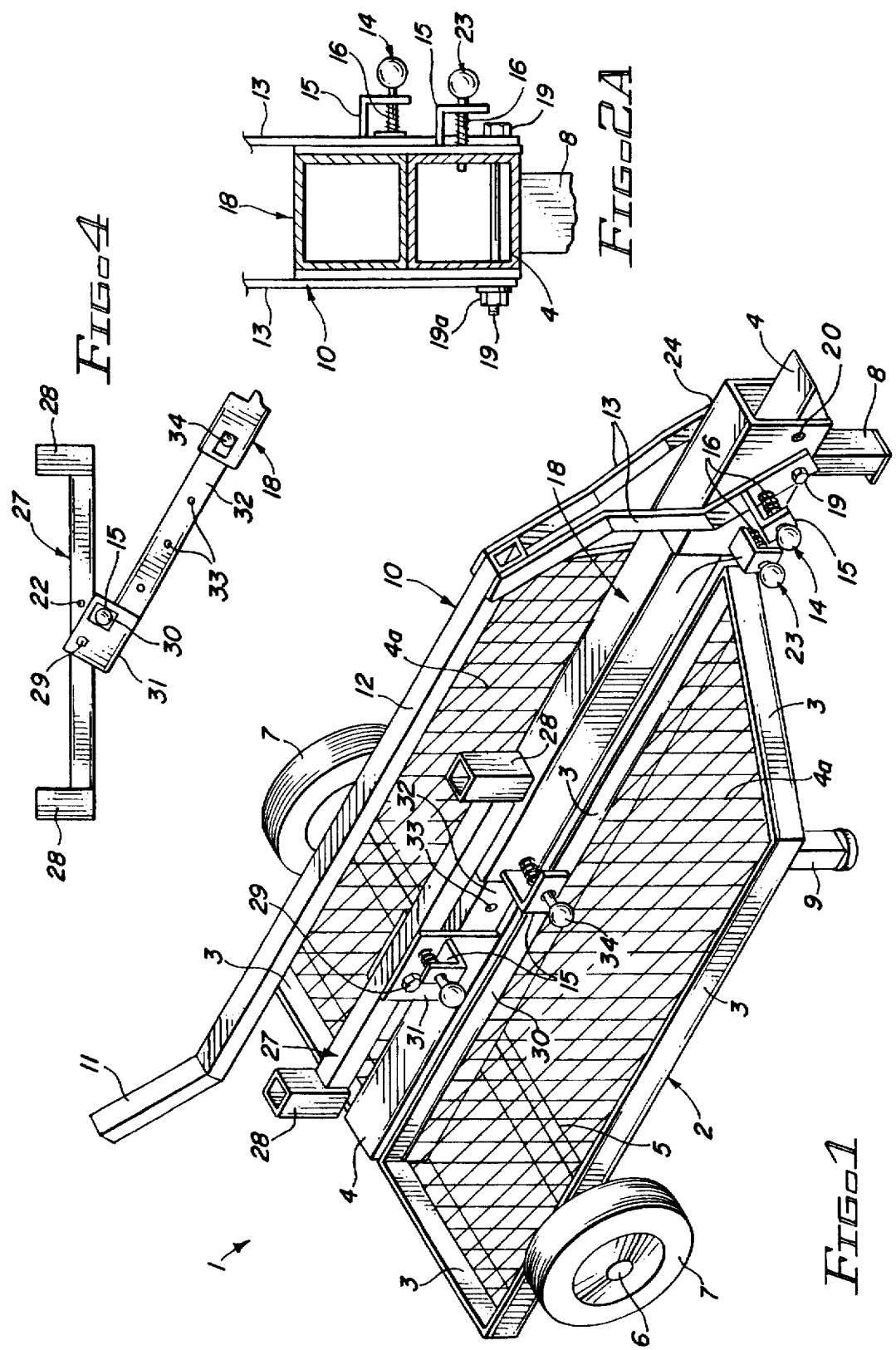

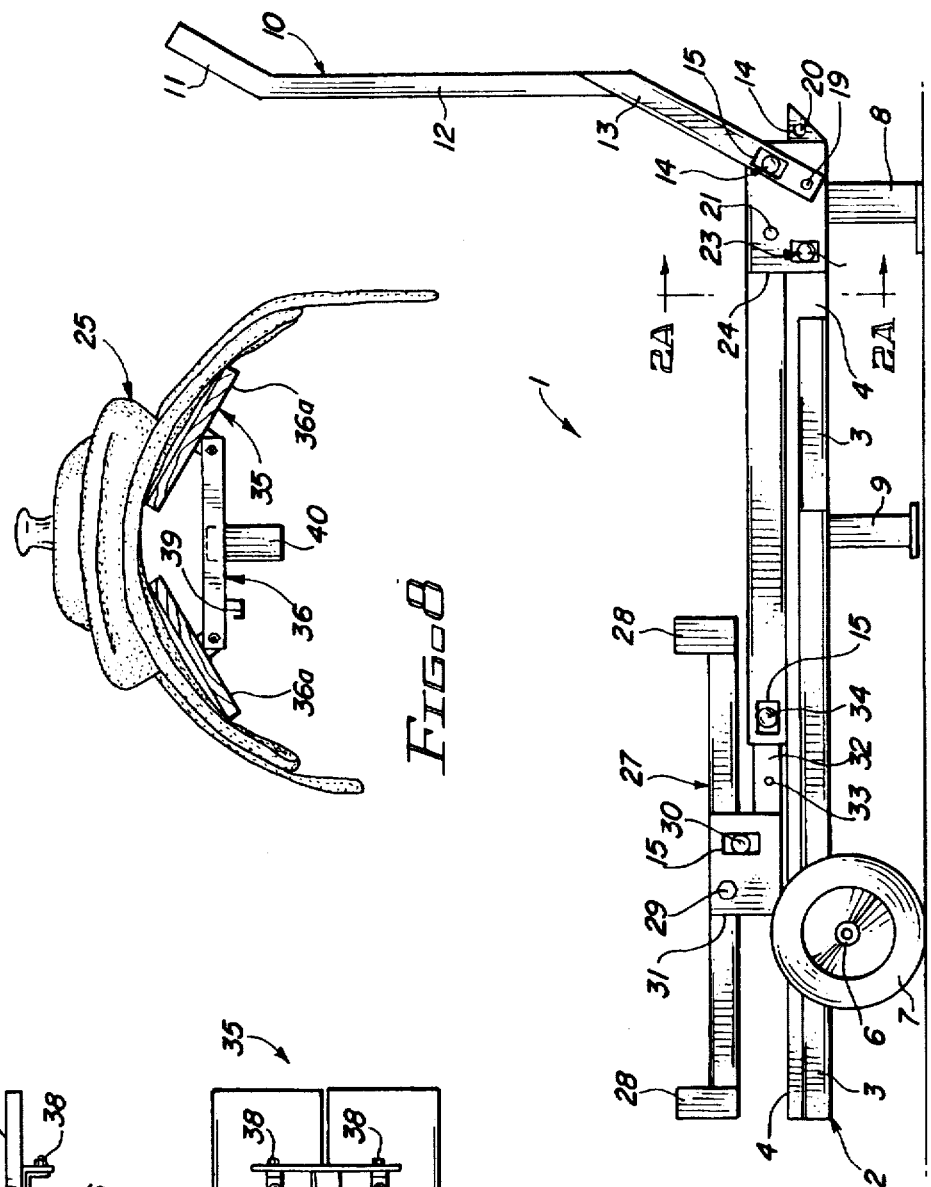

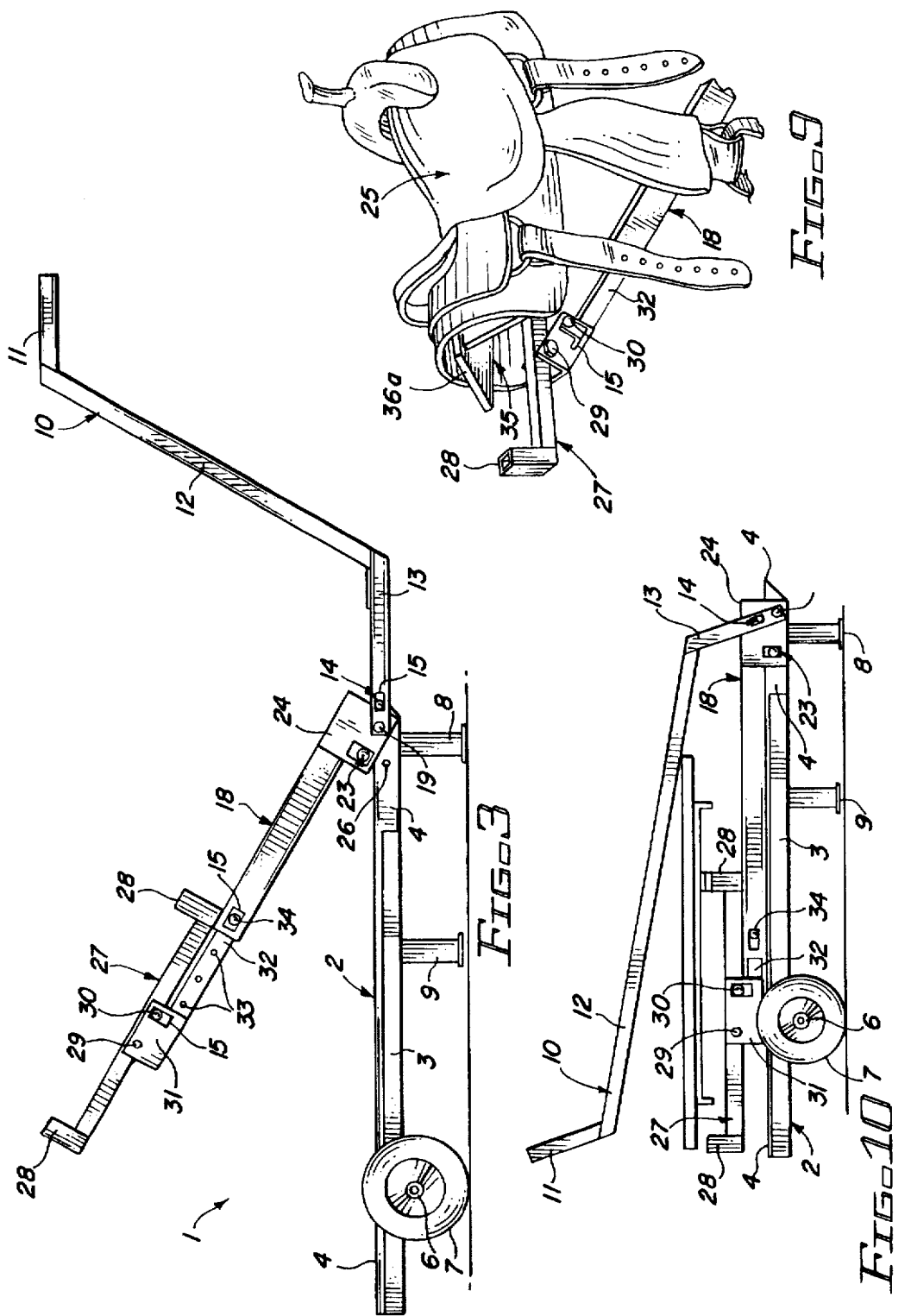

FOLDING SADDLE CARRIER

BACKGROUND OF THE INVENTION

Field of the Invention

This invention relates to devices for transporting equestrian equipment, and primarily saddles, back and forth between horses and transportation or storage facilities for the saddles and equestrian equipment. More particularly, the invention relates to a folding saddle carrier which is characterized by a wheeled frame, sized and shaped to receive various equestrian equipment such as bridles, halters, lead ropes, brushes, curry combs, shampoo and the like. A saddle support riser has one end pivotally attached to the frame and a saddle board support is secured to the free, extensible end of the saddle support riser, and one end of a handle is pivotally attached to the saddle support riser and the frame. Both the handle and the saddle support riser are fitted with adjusting pins to facilitate selectively retracting the handle and saddle support riser in folded configuration against the frame and extending the handle from the folded configuration to effect upward pivoting of the free end of the saddle support riser and positioning one or two saddles on adjustable sets of saddle boards attached to the saddle board support, the latter of which may also be pivotally adjusted with respect to the frame by means of an adjusting pin.

One of the more disagreeable tasks involved in riding horses and particularly, riding horses on a regular basis, is the difficulty of carrying saddles back and forth between the horse or horses and the truck, barn or other area where the saddles are located when not in use. Depending upon size and style, saddles can be quite heavy and a common method of carrying saddles includes grasping the saddle horn and throwing the saddle over the shoulder for transportation from the truck or barn to the horse and back again after riding is completed. This experience is particularly trying for ladies and people of small stature who frequently struggle with the heavy saddles and have difficulty hoisting them to the necessary height to place the saddle on the horse and then again on a storage bench, bracket or block or bed of a pickup truck for storage or transportation purposes.

Accordingly, it is an object of this invention to provide a new and improved folding saddle carrier which is fitted with wheels or runners and includes a pivotally-mounted saddle support riser and complimentary pivoting handle that operate in concert to fold or retract against the saddle carrier frame when not in use and pivot upwardly and outwardly to support one or more saddles when extended in functional configuration.

Another object of the invention is to provide a folding saddle carrier which is characterized by a rigid frame fitted with a pair of wheels, a saddle support riser pivotally attached to the front of the frame by means of a pivot bolt or pin and having a free, preferably extensible end provided with a pivoting saddle board support that accommodates one or two sets of saddle boards for supporting at least one saddle. Further included is a towing handle pivotally attached at one end to the saddle support riser and the frame by means of the saddle support riser pivot bolt or pin, to facilitate folding of the handle and the saddle support riser on the frame in stored configuration, wherein the frame can be selectively suspended from a mount bracket attached to a wall or post or rolled beneath a work bench or the like, for storage purposes.

Yet another object of this invention is to provide a new and improved folding saddle carrier which includes a rigid frame fitted with an axle, a pair of wheels, a central frame rib and an expanded metal storage area, to which rib is pivotally attached a saddle support riser, one end of which is free and telescopically adjustable and receives a pivoting saddle board support, to which one or two sets of saddle-receiving boards may be mounted. A towing handle is pivotally attached at one end to the saddle support riser and the frame and is designed to fold or retract with the saddle support riser against the frame when the folding saddle carrier is not in use and to extend and cause the unattached, telescoping end of the saddle support riser to pivot from the frame responsive to adjustment of a pair of adjusting pins. Elevation of the telescoping end of the saddle support riser positions the saddle board support to receive one or two sets of saddle boards and saddles, for transportation to and from the horse(s).

SUMMARY OF THE INVENTION

These and other objects of the invention are provided in a new and improved folding saddle carrier which, in a preferred embodiment, includes a rigid frame fitted with an axle that rotatably mounts a pair of wheels, with expanded metal provided on the frame for receiving various equestrian accessories such as reins, halters, lead ropes, brushes, curry combs, shampoo and the like. An elongated saddle support riser is pivoted on the front end of the frame by means of a pivot bolt and is provided with a riser adjusting pin for optionally securing the saddle support riser in folded or retracted configuration on the frame. A shaped handle is fitted at one end with a pair of handle mount straps which are, in turn, pivotally attached to the saddle support riser and the frame by means of the pivot bolt, and a handle adjusting pin on the handle serves to lock the handle against the saddle support riser in folded configuration with respect to the carrier frame. Release of the handle adjusting pin and simultaneous extension of the handle upwardly and forwardly about the pivot pin to a towing configuration, causes the free end of the saddle support riser to elevate upon manipulation of the riser adjusting pin. This action further elevates a saddle board support attached to a riser extension, which telescopes into the free end of the saddle support riser, for accommodating one or two sets of saddle boards, thus facilitating transportation of one or two saddles to and from the horse or horses and to a truck, barn or storage area.

DESCRIPTION OF THE PRIOR ART

Various devices for transporting saddles are known in the art. Typical of these devices is the apparatus device detailed in U.S. Pat. No. 3,930,663, dated Jan. 6, 1976, which details a wheeled frame having a handle and a pair of support frame members, with a pivoting, reverse basket-shaped saddle support member for selectively pivoting and retracting in folded configuration against the handle and extending to a substantially horizontal configuration for receiving a saddle. U.S. Pat. No. 5,362,078, dated Nov. 8, 1994, details a frame having a vertical portion defining a forward side and a rearward side and a horizontal portion extending from the forward side of the vertical portion. An axle is offset from the carrier frame on the rearward side and accepts at least one wheel. A height-adjustable saddle arm attachment system is connected to the frame by allowing saddle arms to detachably connect and extend on the forward side of the frame. The saddle rack, for use alone or in combination with the saddle carrier, includes a frame having a vertical portion with a forward and rearward side and a horizontal portion extending from the forward side of the vertical portion. The saddle rack may be slidably engaged by the horizontal portion of the saddle carrier beneath the horizontal portion of the saddle rack. Detachable saddle arms interchangeably connect to the vertical portion of the rack and the carrier.

BRIEF DESCRIPTION OF THE DRAWINGS

The invention will be better understood by reference to the accompanying drawings, wherein:

FIG. 1 is a perspective view of a preferred embodiment of the folding saddle carrier of this invention in folded or retracted configuration;

FIG. 2 is a side view of the folding saddle carrier illustrated in FIG. 1, with the towing arm or handle in partially extended configuration;

FIG. 2A is a sectional view taken along line 2A—2A of the saddle support riser and frame rib components of the folding saddle carrier illustrated in FIG. 2;

FIG. 3 is a side view of the folding saddle carrier illustrated in FIGS. 1 and 2, with the handle extended forwardly into towing configuration and the saddle support riser pivoted upwardly into saddle supporting configuration;

FIG. 4 is a side view of the extending end of the saddle support riser and telescoping riser extension, along with a pivoting saddle board support element of the folding saddle carrier illustrated in FIG. 1;

FIG. 5 is a side view of a preferred set of saddle boards for mounting on the saddle board support illustrated in FIG. 4 and supporting a saddle;

FIG. 6 is a bottom view of the set of saddle boards illustrated in FIG. 5;

FIG. 7 is an end view of the set of saddle boards illustrated in FIGS. 5 and 6;

FIG. 8 is an end view of the set of saddle boards illustrated in FIGS. 5-7, with a saddle positioned in functional configuration thereon;

FIG. 9 is a perspective view of the set of saddle boards illustrated in FIGS. 5-7 mounted on the saddle board support illustrated in FIG. 4, with a saddle positioned thereon;

FIG. 10 is a side view of the folding saddle carrier illustrated in FIG. 1, with a set of the saddle boards positioned on the saddle board support while the folding saddle carrier is in the folded configuration;

DESCRIPTION OF THE PREFERRED EMBODIMENTS

Figure 11:
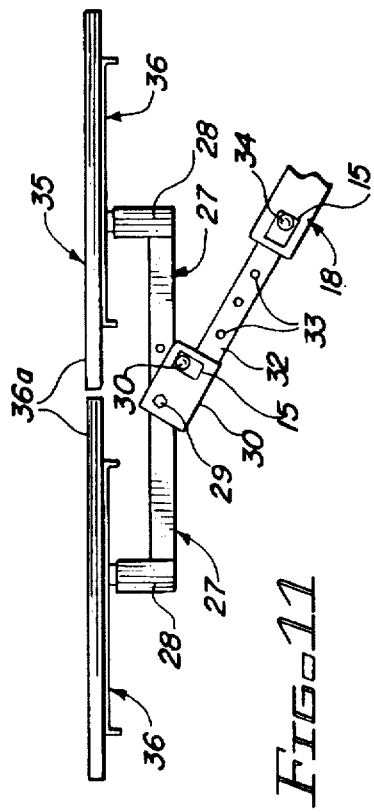
FIG. 11 is a side view of the saddle board support element of the folding saddle carrier illustrated in FIG. 4, with a pair of saddle board sets mounted thereon.
Figure 12:
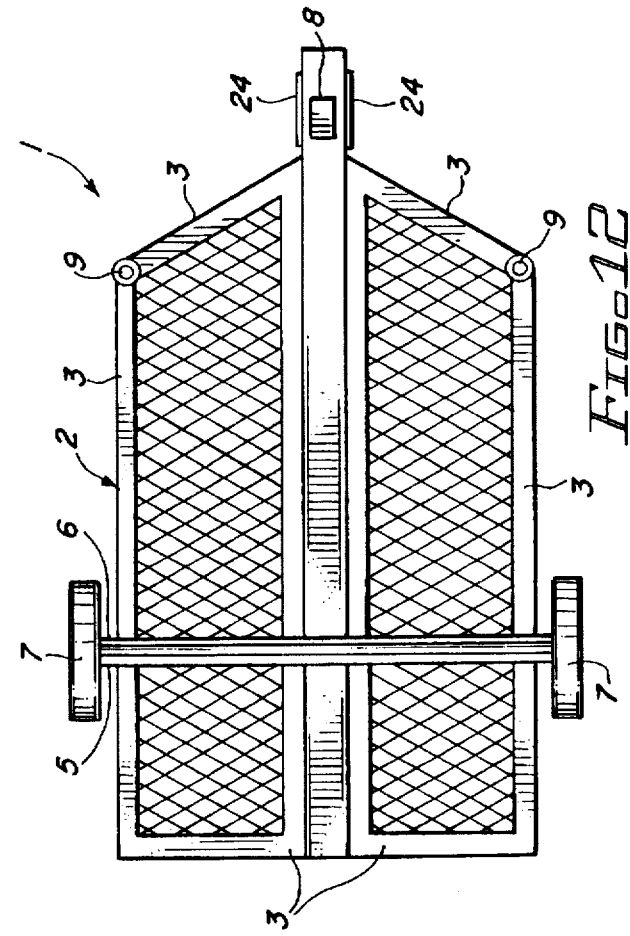
FIG. 12 is a bottom view of the folding saddle carrier illustrated in FIG. 1.

Referring initially to FIGS. 1-3 and 12 of the drawings, the folding saddle carrier of this invention is generally illustrated by reference numeral 1. The folding saddle carrier 1 is characterized by a rigid carrier frame 2, defined by perimeter frame members 3, which are typically constructed of welded angle iron, with a box tubing frame rib 4 extending longitudinally through the center of the carrier frame 2. As illustrated in FIGS. 1 and 12, an angle iron axle mount 5 is shaped in the bottom of the carrier frame 2 to accommodate an axle 6, to the ends of the latter which are rotatably-mounted wheels 7, in conventional fashion. A front leg 8 projects downwardly from welded attachment to the bottom of the frame rib 4 and a pair of shorter side legs 9 project downwardly from welded attachment to the side perimeter frame members 3, in order to stabilize the carrier frame 2 in functional configuration on the wheels 7, as further illustrated in FIGS. 1 and 2. One end of a handle 10 is provided with a handle grip 11 and the handle grip 11 extends to a handle shaft 12, that terminates at the opposite end from the handle grip 11 in a pair of spaced-apart, shaped handle mount straps 13. The free ends of the handle mount straps 13 are pivotally secured by means of a pivot pin 19 to the riser plate 24 of a saddle support riser 18, and to the forward end of the frame rib 4 of the carrier frame 2. The riser plate 24 is, in turn, pivotally attached to the projecting forward end of the frame rib 4, also by means of the pivot pin 19, as illustrated in FIG. 2A. Accordingly, it will be appreciated from a consideration of FIGS. 1, 2A and 2 that the saddle support riser 18 may pivot on the pivot pin 19 into a folded or retracted configuration, lying adjacent the frame rib 4, while the handle 10, in turn, lies adjacent to the saddle support riser 18 and the handle grip 11 projects upwardly in angular relationship from the handle shaft 12 of the handle 10. In a most preferred embodiment of the invention a riser adjusting pin 23 is mounted on an L-shaped pin mount 15, welded or otherwise attached to the riser plate 24, and includes a pin spring 16, positioned within the pin mount 15, to facilitate selective registration of the riser adjusting pin 23 with a corresponding frame rib opening 26, provided in the frame rib 4, as illustrated in FIGS. 2 and 3. A saddle board support 27 is pivotally attached by means of a support pivot pin 29 to a support mount plate 31, fixed to the extending free end of a riser extension 32, extending from the saddle support riser 18, as further illustrated in FIG. 1. The saddle support 27 includes a pair of upward-standing support posts 28 at each end thereof for receiving one or both of the mount legs 40 of the sets of saddle boards 35, illustrated in FIGS. 5-7 and 11. In a preferred embodiment of the invention the riser extension 32 is telescopically received inside the saddle support riser 18 and may be extended and retracted inside the saddle support riser 18 and longitudinally adjusted therein by means of the riser extension pin 34, which is urged by means of a pin spring 16 through an opening (not illustrated) in the saddle support riser 18 and selected registering riser extension openings 33, as further illustrated in FIG. 3. A support adjusting pin 30 is mounted on the support mount plate 31 by means of a pin mount 15 in the same manner as the riser adjusting pin 23 and the handle adjusting pin 14, heretofore described, for purposes which will be further hereinafter described.

Each of the sets of saddle boards 35 is characterized by a board frame 36, illustrated in FIGS. 5-7 and a pair of boards 37 are pivotally attached to the board frame 36 by means of board cleats 37a and pivot bolts 38. A bucket bracket 39 is provided on each of the sets of board frames 36, for hanging a bucket (not illustrated) from the folding saddle carrier 1. A mount leg 40 extends from a spanning member 43 to removably engage the upward-standing support post 28 on the saddle board supports 27, respectively. Accordingly, referring again to FIG. 11 of the drawings, one or both of the sets of saddle boards 35 can be removably attached to the support post or posts 28 of the saddle board support 27 to support one or two saddles 25, as desired.

Figure 13:
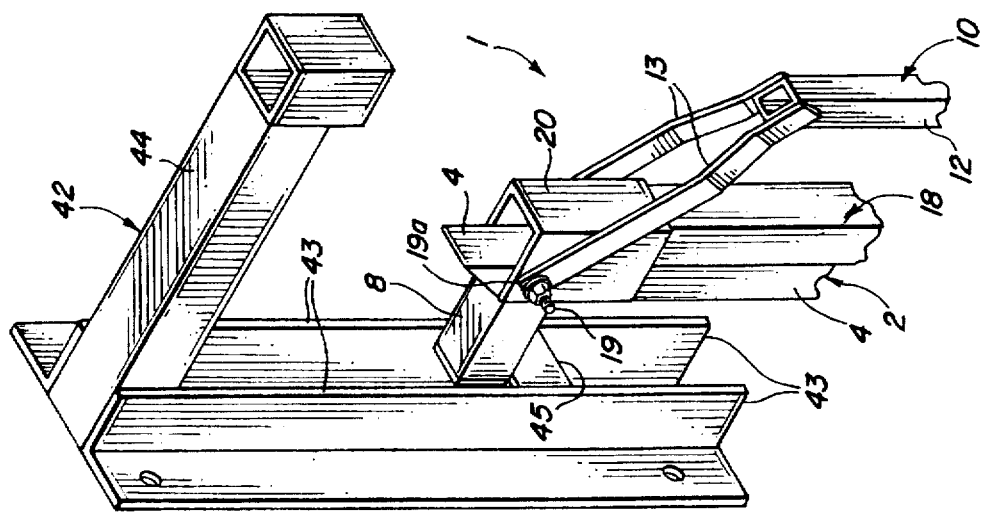
FIG. 13 is a perspective view, partially in section, of the front end of the folding saddle carrier illustrated in FIG. 1, wherein the folding saddle carrier is removably suspended from a fixed bracket for storage purposes.

Referring now to FIG. 13 of the drawings, in another preferred embodiment of the invention a mount bracket 42 can be nailed, bolted or otherwise fixed to a vertical post or wall (not illustrated) for removably receiving and storing the folding saddle carrier 1. The mount bracket 42 is equipped with vertical, spaced-apart mount bracket flanges 43, with a support arm 44 projecting outwardly from the top of the mount bracket flanges 43 for receiving a saddle (not illustrated), as desired. A support plate 45 spans the mount bracket flanges 43 beneath the support arm 44 for receiving the front leg 8 of the carrier frame 2 and removably mounting the folding saddle carrier 1 in folded configuration on the mount bracket 42.

In use, the folding saddle carrier 1 of this invention is quickly and easily deployed for receiving one or two saddles 20 and carrying the saddles 20 to and from a vehicle or storage location and a horse or horses. The folding saddle carrier 1 may initially be folded or retracted in the configuration illustrated in FIG. 1 and may optionally be suspended from the mount bracket 42 in the manner illustrated in FIG. 13. When placed on a flat surface, the retracted folding saddle carrier 1 is functionally deployed as follows: the handle 10 is initially pivoted upwardly and forwardly to the upright position illustrated in FIG. 2, by grasping the handle adjusting pin 14 and removing the extending end of the handle adjusting pin 14 from the corresponding rear handle pin opening 21 against the tension in the pin spring 16, to facilitate pivoting of the handle 10 on the pivot pin 19. Further rotation of the handle 10 forwardly and downwardly as illustrated in FIG. 3, exerts pressure on the saddle support riser 18, which is pivotally attached to the frame rib 4, also by means of the pivot pin 19. Grasping of the riser adjusting pin 23 and extension of the extending end of the riser adjusting pin 23 from the corresponding frame rib opening 26 against the tension in the corresponding pin spring 16, facilitates pivoting of the saddle support riser 18, riser extension 32 and the saddle board support 27 upwardly to the position illustrated in FIG. 3. Outward pressure applied to the support adjusting pin 30 removes the support adjusting pin 30 from the board support opening 22 in the saddle support board 27 and facilitates pivoting of the saddle board support 27 on the corresponding support pin pivot 29 to the horizontal position, as illustrated in FIG. 4. Adjustment of the height of the saddle board support 27 with respect to the carrier frame 2 is facilitated by similar adjustment of the rear extension pin 34, mounted on the saddle support riser 18, into a selected one of the riser extension openings 33, to allow telescoping of the riser extension 32 with respect to the saddle support riser 18. A set of saddle boards 35 can then be removably secured to either one of the upright support posts 28 provided on the saddle support board 27, and adjusted to support a saddle 25, as illustrated in FIGS. 8 and 9. Two such saddle board plates 36a may be mounted in this manner on the saddle board supports 27 as further illustrated in FIG. 11, to receive two saddles (not illustrated), as desired. The saddle or saddles 25 can then be easily transported to and from a vehicle, storage area and a horse or horses, by grasping the handle grip 11 of the handle 10 and towing the folding saddle carrier 1 to the desired location.

It will be further appreciated by those skilled in the art that the folding saddle carrier 1 of this invention can also be used to carry accessory equipment such as farrier tools, nails and horseshoes, bridles, halters, lead ropes, brushes, curry combs, shampoo and other accessory equipment and supplies on the expanded metal 4a located on the carrier frame 2 of the folding saddle carrier 1. The folding saddle carrier 1 thus becomes a movable, easily towable cart or accessory for moving one or two saddles, as well as various equipment and supplies to and from a vehicle or storage location and the horses, as desired. A bucket (not illustrated) can be suspended from the bucket bracket 39, mounted on the board frame 36 of each of the sets of saddle boards 35, for washing or feeding the horse or horses, as desired.

It will be appreciated by those skilled in the art that the sets of saddle boards 35 in the folding saddle carrier 1 are versatile, in that the respective board plates 36a are pivotally attached to the corresponding board frame 36 by means of the pivot bolts 38, positioned in the board cleats 37a, welded or otherwise fixed to the board frame 36. This facility allows selected individual pivotal adjustment of the board plates 36a with respect to the board frame 36 to accommodate a saddle 25 of substantially any weight, design, size and style, as illustrated in FIGS. 8 and 9. Furthermore, both of the sets of saddle boards 35 can be configured to support two saddles, as further illustrated in FIG. 11 of the drawings. Moreover, one or both of the sets of saddle boards 35 can be maintained in position on the saddle board support 27 when the folding saddle carrier 1 is retracted into the folded configuration, as illustrated in FIG. 10.

Referring again to FIGS. 1-3 of the drawings, under circumstances where it is desired to fold and retract the folding saddle carrier 1 from the extended, functional configuration back into its folded configuration for storage, either suspended from the mount bracket 42 as illustrated in FIG. 13 or elsewhere, the following procedure is implemented: the riser adjusting pin 23 is initially manipulated to facilitate downward pivoting of the saddle support riser 18 toward the frame rib 4. The handle 10 is simultaneously lifted and pivoted rearwardly from the position illustrated in FIG. 3 to the position illustrated in FIG. 2 as the handle adjusting pin 14 is manipulated to exit the forward handle pin opening 20 and facilitate rearward folding of the handle 10 to the position illustrated in FIG. 1. At this point in the retraction procedure, the handle adjusting pin 14 is allowed to engage the rear handle pin opening 21 as the riser adjusting pin 23 enters the frame rib opening 26, to lock the folding saddle carrier 1 into the folding and retracted configuration illustrated in FIG. 1.

It will be further appreciated by those skilled in the art that the optional side legs 9 are provided on the side perimeter frame members of the carrier frame 2 to facilitate stability in the carrier frame 2 in case a person or a horse should inadvertently step on the carrier frame 2, to prevent tilting of the carrier frame 2 and spilling the contents. It will be further appreciated that the folding saddle carrier 1 of this invention can be constructed in substantially any desired size, according to the needs of the user. Moreover, under circumstances where horses are ridden in areas having snow cover, skis or runners (not illustrated) can be mounted on the carrier frame 2, either in place of, or in combination with the wheels 7, for ease of towing. As illustrated in FIG. 13, it will be appreciated that one of the sets of saddle boards 35 can be mounted on the support arm 44 of the mount bracket 42 in the same manner as mounted on the saddle board support 27, illustrated in FIG. 11.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A folding saddle carrier comprising a wheeled frame, a saddle support riser having one end pivotally connected to said frame and the opposite end of said saddle support riser extending over said frame; a riser extension adjustably carried by said opposite end of said saddle support riser and a saddle board support pivotally mounted on said riser extension; at least one set of saddle boards mounted on said saddle board support for receiving a saddle; a handle having a bifurcated end spanning said one end of said saddle support riser, said bifurcated end of said handle pivotally connected to said one end of said saddle support riser and said frame; a handle adjusting pin carried by said handle and releasably engaging said saddle support riser and said frame for pivoting said handle with respect to said frame; and a riser adjusting pin carried by said saddle support riser and releasably engaging said frame, whereby said opposite end of said saddle support riser is elevated responsive to release of said handle adjusting pin from said saddle support riser and said frame, release of said riser adjusting pin from said frame and pivoting of said handle away from saddle support riser.

2. The folding saddle carrier of claim 1 comprising a saddle board support adjusting pin carried by said saddle board support for releasably engaging said riser extension and pivotally adjusting said saddle board support and said saddle boards with respect to said riser extension and said frame.

3. A folding saddle carrier comprising a frame, a pair of wheels rotatably carried by said frame; at least one leg provided on said frame in spaced relationship with respect to said wheels for supporting said frame with said wheels; an elongated saddle support riser having one end pivotally connected to said frame and the opposite end of said saddle support riser unattached to said frame; a riser extension adjustably carried by said opposite end of said saddle support riser; a handle having one end spanning one end of said saddle support riser, said one end of said handle pivotally connected to said one end of said saddle support riser and said frame; a handle adjusting pin carried by said handle and releasably engaging said saddle support riser and said frame for locking said handle with respect to said frame; a saddle board support pivotally carried by said riser extension; at least one set of saddle boards mounted on said saddle board support for receiving a saddle and a riser adjusting pin carried by said saddle support riser and releasably engaging said frame for pivotally adjusting said saddle board support and said saddle boards with respect to said frame, whereby said opposite end of said saddle support riser and said riser extension are pivotally disposed against said frame responsive to release of said handle adjusting pin from said saddle support riser and said frame and pivoting of said handle toward saddle support riser, said opposite end of said saddle support riser is pivotally elevated from a retracted configuration to an extended configuration responsive to release of said handle adjusting pin from said saddle support riser and said frame and said riser adjusting pin from said frame, and pivoting of said handle away from said saddle support riser.

4. The folding saddle carrier of claim 3 comprising a saddle board support adjusting pin carried by said saddle board support for releasably engaging said riser extension and pivotally adjusting said saddle board support and said saddle boards with respect to said riser extension and said frame.

5. The folding saddle carrier of claim 3 comprising a support bracket for removably receiving said leg and supporting said folding saddle carrier in said retracted configuration.

* * * * *